United States Patent Office 3,038,906
Patented June 12, 1962

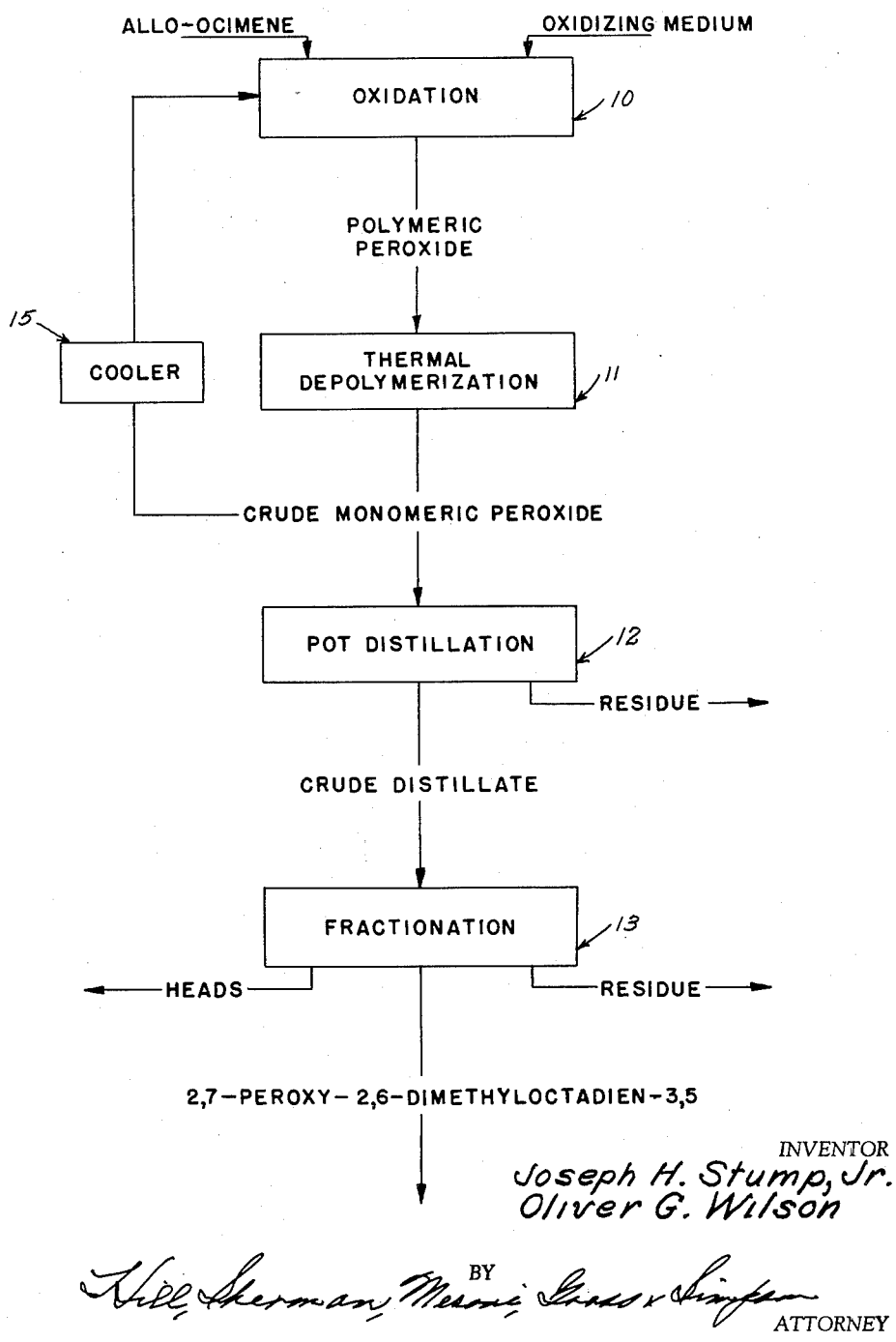

3,038,906
OXIDATION OF ALLO-OCIMENE
Joseph H. Stump, Jr., Pensacola, Fla., and Oliver G. Wilson, Fort Worth, Tex., assignors to Heyden Newport Chemical Corporation, New York, N.Y., a corporation of Delaware
Filed Feb. 29, 1960, Ser. No. 11,899
9 Claims. (Cl. 260—338)

The present invention is directed to an improved method for the oxidation of allo-ocimene to produce a monomeric peroxide product.

We have found that the compound allo-ocimene can be converted to a valuable peroxide product in a process which lends itself very readily to continuous operation. Broadly speaking, the process involves oxidizing the compound allo-ocimene under non-acidic conditions to produce a polymeric peroxide product and subsequently depolymerizing the polymeric product to yield a monomeric peroxide which has been identified as the compound 2,7-peroxy-2,6-dimethyloctadien-3,5.

The peroxide compound is useful as a catalyst for the polymerization of vinyl compounds and as a starting material for the preparation of mono-olefinic secondary alcohols, esters, and ketones used as bases for rose perfumes.

An object of the present invention is to provide an improved process for oxidizing allo-ocimene to produce a monomeric peroxide product.

Another object of the invention is to provide a process for the oxidation of allo-ocimene to a monomeric peroxide product in a continuous manner.

Still another object of the invention is to provide a process for the oxidation of an allo-ocimene to a peroxide which minimizes the amount of undesirable by-products produced.

A description of the process involved in the present invention can best be made by reference to the accompanying drawing which illustrates a flow chart of the process involved.

In the single FIGURE of drawing, reference numeral 10 indicates generally an oxidation stage in which the compound allo-ocimene is reacted with an oxidizing medium to produce a polymeric peroxide product. As the oxidizing medium, we have successfully employed air, commercial oxygen, and hydrogen peroxide although other oxidizing media containing or yielding sufficient amounts of molecular oxygen can also be employed.

In the oxidation step, it is important that the oxidizing medium and the allo-ocimene be intimately mixed together. Accordingly, improved results are obtained by the use of elevated pressures in the oxidation stage, although quite satisfactory results can be obtained by operation at atmospheric pressure conditions, provided that sufficient mechanical agitation is employed in the oxidation zone.

The temperature of oxidation is dependent upon the yield of the by-products which can be tolerated, and the speed of reaction desired. We have employed temperatures ranging from 5° C. to about 105° C. successfully. The reaction proceeds more slowly at the lower temperature, but the yield of undesirable by-products is reduced. At the upper end of the range, the reaction proceeds quite rapidly, but the side reactions occur to a greater extent than at the lower temperatures.

Regardless of the nature of the oxidizing medium, the reaction will proceed smoothly under alkaline conditions existing by the addition of a base such as sodium hydroxide or sodium carbonate to the reaction medium. This alkaline material neutralizes acids as they are produced during the course of the reaction. The presence of these acids has been found to accelerate decomposition of the desired product. When a gaseous oxidizing medium such as air or oxygen is employed, the reaction may also be carried out without the addition of alkaline agents by employing a sufficiently high mass velocity of the gas to carry away any volatile acids as soon as they are formed.

After the initial oxidation in the oxidation stage 10, the polymeric peroxide which results is passed to a thermal depolymerization stage identified at reference numeral 11 in the drawing. Preferably, the transfer of material from the oxidation stage 10 to the thermal depolymerization stage 11 is made on a continuous basis by withdrawing a portion of the oxidate from the stage 10 as a side stream and passing it to the depolymerization stage 11.

In the stage 11, the polymer is heated to a temperature in the range from about 70° C. to about 180° C. to decompose it to the monomeric form. Preferably, the depolymerization takes place at a temperature in the range from about 100 to 120° C. The depolymerization may be carried out under vacuum conditions or at atmospheric pressure.

The rate of flow of the polymer through the thermal depolymerization stage 11 is dependent upon the oxidation rate and the temperature of the depolymerization stage 11. The following table indicates the residence time required to decompose one-half of the polymeric peroxide at various temperatures:

| Temperature, °C.: | Time in minutes |
|---|---|
| 73 | 4.0 |
| 85 | 2.5 |
| 98 | 0.9 |
| 122 | 0.4 |
| 138 | 0.4 |

At the most desirable operating condition, the rate of flow through the depolymerization stage 11 is adjusted so that the effluent from that stage will have a minimum amount of polymeric peroxide content, while maintaining a low level of polymeric peroxide in the oxidation stage 10.

Initially, the system is operated batch-wise so that all of the material leaving the stage 11 is returned to the oxidation stage 10. When the concentration of monomeric peroxide has reached a sufficiently high level, the product from the stage 11 is split into two portions, one for recycle to the oxidation stage 10 and the other for distillation.

A side stream containing unreacted allo-ocimene and monomeric peroxide is sent through a cooler 15 maintained at a temperature of about 20 to 25° C. The cooled materials are then returned to the oxidation stage 10 along with continuously added allo-ocimene. By operating in this manner, we can secure high conversion of allo-ocimene without hazards being presented.

The remainder of the product of stage 11 is passed into a pot distillation step identified at numeral 12 in the drawing. We recommend a head pressure of five to fifteen millimeters and a maximum pot temperature of 160° C. for this stage. Most of the distillation takes places at a pot temperature of 123 to 130° C. The crude distillate resulting from boiling off the more volatile products is then passed to a fractionation stage 13 for final recovery of the product. The residue resulting from the initial distillation of the stage 12 may be discarded or removed.

The fractionation stage 13 is operated under temperature conditions sufficient to produce a fraction containing a substantial amount of the compound 2,7-peroxy-2,6-dimethyloctadien-3,5. Any residue produced may be discarded. The more volatile products appearing in the heads fraction may be recovered or recycled back to the oxidation stage 10.

Composited cuts from the fractionation have a boiling range of 103° to 107° C. at 11 mm. of Hg absolute pressure, a refractive index, $n_D^{20}$ of about 1.4645, and a density at 15°/4° of 0.953.

The structural formula for the monomer is represented as follows:

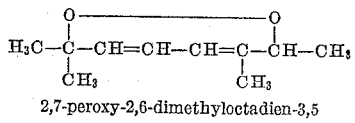

2,7-peroxy-2,6-dimethyloctadien-3,5

The structure of the production was determined in the following manner. It was determined that the monomer reacts with potassium iodide in acetic acid solution to liberate iodine. This reaction established that the product is a peroxide. The product reacts with water at room temperature to produce a reaction product which does not liberate iodine from potassium iodide in acetic acid solution.

The monomer was quantitatively hydrogenated using Raney nickel as a catalyst at room temperatures and the hydrogenation resulted in the absorption of three moles of hydrogen for every mole of the monomer. Dehydration of the product of hydrogenation by steam distillation from a 1% phosphoric acid solution yielded an alcohol which was oxidized with alkaline potassium permanganate to yield acetone and a lactone having an equivalent weight of 125. The lactone and the ketone which resulted from a chromic acid oxidation of the alcohol produced by the dehydration reaction gave a positive iodoform test. These reactions established that one of the oxygen linkages is on a tertiary carbon atom and one is on a secondary carbon atom. The reactions also established that the secondary carbon atom is alpha to a methyl group and the tertiary carbon atom is the number two carbon of the isopropyl group.

The product resulting from the reaction of the peroxide with water was oxidized by means of alkaline potassium permanganate to produce several products which included acetone, acetic acid, carbon dioxide, and oxalic acid. Adjacent hydroxyl determination of the product resulting from the reaction of the monomer with water gave a value of 1.7 moles of adjacent hydroxyls per mole of hydrated product.

A determination of the ultra violet absorption spectrum of the peroxide gave maxima at 236 and 285 mu. The ultra violet absorption spectrum of a selected cut of partially hydrogenated peroxide gave a maximum at 236 mu.

From the last-named experiments, it was determined that the peroxide contained a conjugated double bond system, resulting in the determination of the structural formula given previously.

Finally, the carbon and hydrogen analyses of the product yielded the following results.

|   | Found | Theory for $C_{10}H_{16}O_2$ |
|---|---|---|
| C | 71.2 | 71.43 |
| H | 9.5 | 9.52 |

The following specific examples illustrate the results obtained under various conditions of reaction.

*Example I*

A mixture of 3000 grams of allo-ocimene and 60 grams of sodium carbonate was charged into a four liter resin kettle equipped with a thermometer, stirrer, and a fritted glass gas inlet tube which was connected through a flow meter to a source of compressed air. Air at the rate of 1.5 liters per minute was passed through the well-stirred mixture for 54 hours, while the temperature was maintained at 28–30° C.

The material recovered consisted of 3235 grams of a viscous oil which contained polymeric oxygenated material. The oil was flash distilled in small batches at a reduced pressure of 2–10 millimeters of mercury and temperatures of 70–180° C. to depolymerize the polymer and isolate the crude monomeric peroxide. The yield was 2830 grams of a crude distillate having an index of refraction $n_D^{20}$ of 1.5116, together with 331 grams of residue.

The crude distillate was fractionated in a column packed with Berl saddles to yield 1456 grams of unreacted allo-ocimene, 500 grams of recycle cuts, 768 grams of a product peroxide having an index of refraction $n_D^{20}$ of 1.4645 and 115 grams of residue.

*Example II*

A mixture of 2000 grams of allo-ocimene and 20 grams of sodium carbonate was charged to the oxidizer. Air at a rate of 1.5 liters per minute was passed through the well-stirred mixture for 22 hours. The temperature was in the range of 27–29° C. The viscous oil which resulted was heated to above 70° C. in small batches to depolymerize the polymer. The product was cooled to room temperature and then returned to the oxidizer. The oil had an index of refraction $n_D^{20}$ of 1.5098. Oxidation was continued for a period of 26 hours and then the polymer was depolymerized by heat as before. The index of refraction of the oil was $n_D^{20}$ 1.4860 at this time. The oil was then oxidized for a third time under the same conditions as previously and then depolymerized and finally pot distilled to yield 1594 grams of distillate, having an index of refraction of $n_D^{20}$ 1.4669, and 620 grams of residue. The distillate was fractionated to yield 455 grams of heads and intermediates, 1026 grams of peroxide, and 87 grams of residue.

*Example III*

A 3000 gram sample of allo-ocimene was charged into an oxidizer, and air at the rate of 3 liters per minute was passed through the well-stirred oil. At this velocity, the air carried away the volatile acids produced during the course of the reaction, as borne out by the fact that the crude oxidate had an acid number of 0.6. The temperature of the allo-ocimene in the oxidizing zone was 28 to 38° C. during the course of the reaction. A portion of the reaction product was continuously withdrawn from the oxidation zone and passed through a coil located in a hot oil bath maintained at a temperature of 120 to 140° C. The rate of flow of the material through the tube in the bath was such that the exit temperature was 75 to 100° C.

After passing through the coil in the hot oil bath, the oil was passed through a coil located in a cold water bath maintained at a temperature of from 23 to 25° C.

The material after leaving the cold water bath was recirculated back to the oxidizing zone, and oxidation was continued until an index of refraction of $n_D^{20}$ 1.483 was attained. This required 36 hours of aeration time.

The product consisted of 3242 grams of oil which, upon distillation at reduced pressures in a Claisen still, yielded 2420 grams of distillate having an index of refraction of $n_D^{20}$ 1.4718 and 837 grams of residue. Fractionation of the distillate resulted in the recovery of 1343 grams of the peroxide.

*Example IV*

A mixture of 501 grams of allo-ocimene, 220 grams of water and 55 grams of sodium hydroxide was charged into a flask equipped with stirrer, thermometer, cooling bath and dropping funnel. The mixture was cooled to 8° C. and over a period of 3 hours, 600 grams of 35% by weight of hydrogen peroxide was added to the well-stirred mixture. The agitation and cooling were continued for 18 additional hours and then the water phase was removed. The tacky organic layer remaining was dissolved in ethyl acetate to aid in the separation of the water.

The ethyl acetate was removed at reduced pressures of about 200 mm. and below 80° C. When the temperature of the pot reached 70–90° C., and the vigorous depolymerization reaction began, the residue was transferred to a low pressure still to complete the polymer depolymerization and to distill the peroxide. The low pressure still was operated at a pressure of 5–10 mm. of mercury. The product was removed until a pot temperature of 175–180° C. was reached. The yield was 482 grams of a crude distillate having an index of refraction of $n_D^{20}$ 1.4846, and 85 grams of residue. The distillate was combined with another batch and fractionally distilled to recover unreacted allo-ocimene and peroxide product.

*Example V*

A 14,600 gram sample of allo-ocimene was charged to the oxidizer which was equipped for continuous decomposition of polymeric peroxide. Commercial oxygen was used as the oxidizing agent. Reaction was continued at 25 to 35° C. with 3.5–4.4 liters of oxygen per minute being introduced for 15¼ hours. The decomposition tube was maintained at a temperature of 120–140° C. The space velocity of the oil through the decomposition tube varied from 0.3 min.$^{-1}$ to 1.5 min.$^{-1}$. The volume of the decomposition section was 100 milliliters.

At the end of the reaction period, there were recovered 17,040 grams of oil having an index of refraction of $n_D^{20}$ 1.481. A flash distillation of this product gave 12,950 grams of a peroxide distillate having an index of refraction of $n_D^{20}$ 1.4680, and 3590 grams of residue.

*Example VI*

The oxidizer consisted of a 50 gallon water-cooled oxidizer with agitator, thermometer, air inlet tube and an air vent. A steam heat exchanger, two water-cooled heat exchangers, a flow meter, and a circulating pump were added to this basic unit. The working capacity of the entire system was 85 gallons.

The system was charged with 578 pounds of allo-ocimene. Agitation was begun and air was introduced at 8.1 standard cubic feet per minute. Oil was started circulating through the thermal decomposition heat exchanger at 1.7 gallons per minute. The fluid flow through the decomposer was maintained at a rate of 0.8 gallons per minute. The oxidizer temperature was 33 to 40° C. and the temperature in the thermal decomposition heat exchanger was 106 to 108° C. The first cooler was operated at a temperature of 49 to 54° C., and the second cooler at 30 to 38° C.

The progress of the reaction was followed by determinations of the refractive index, and when the value had reached 1.4783, the reaction was discontinued. The reaction time was 22½ hours. A yield of 658 pounds of crude oxidate was recovered. This residue was pot distilled to give 462 pounds of crude peroxide distillate and 196 pounds of non-volatile residue.

This application is a continuation-in-part of our copending application, Serial No. 704,990, filed December 24, 1957, and entitled "Oxidation of Allo-Ocimene."

We claim as our invention:

1. The method of producing a monomeric peroxide of allo-ocimene which comprises oxidizing allo-ocimene at a temperature of from 5° to 105° C. to produce a polymeric peroxide product, removing acidic reaction products as formed, thermally depolymerizing the polymeric peroxide at a temperature of from 70° to 180° C. and recovering a monomeric peroxide from the depolymerized product.

2. The method of producing a monomeric peroxide of allo-ocimene which comprises introducing a stream of air into a body of allo-ocimene maintained at a temperature of from 5° to 105° C. at a mass velocity sufficient to carry away volatile acids present as they are formed and leave a reaction mixture containing a polymeric peroxide product, thermally depolymerizing the polymeric peroxide and recovering a monomeric peroxide from the depolymerized product.

3. The method of producing a monomeric peroxide of allo-ocimene which comprises introducing a stream of air into a body of allo-ocimene maintained at a temperature of from 5° to 105° C. at a mass velocity sufficient to carry away volatile acids present as they are formed and leave a reaction mixture containing a polymeric peroxide product, thermally depolymerizing the polymeric peroxide at a temperature of from 70° to 180° C. and recovering a monomeric peroxide from the depolymerized product.

4. The method of producing a monomeric peroxide of allo-ocimene which comprises oxidizing allo-ocimene at a temperature of from 5° to 105° C. to yield a polymeric peroxide, removing acidic reaction products as they are formed, continuously withdrawing a portion of the oxidate thus produced, thermally depolymerizing the withdrawn portion at a temperature in the range from 70° to 180° C. recycling at least a portion of the depolymerized product back to the oxidizing stage, and recovering a monomeric peroxide from the depolymerized product.

5. The method of producing a monomeric peroxide of allo-ocimene which comprises oxidizing allo-ocimene in an alkaline reaction medium and at a temperature of from 5° to 105° C. to yield a polymeric peroxide continuously withdrawing a portion of the oxidate thus produced, thermally depolymerizing the withdrawn portion at a temperature in the range from 70° to 180° C. recycling at least a portion of the depolymerized product back to the oxidizing stage, and recovering a monomeric peroxide from the depolymerized product.

6. A method of producing 2,7-peroxy-2,6-dimethyl-octadien-3,5, which comprises introducing allo-ocimene into a liquid phase oxidizing zone with agitation thereof in the presence of molecular oxygen to effect reaction therewith at a temperature of between 5 and 105° C. under neutral to alkaline conditions to produce a polymeric peroxide product, withdrawing the resulting polymeric peroxide product to maintain a low level of such product in said oxidizing zone, thermally decomposing the withdrawn product in a second zone at a temperature of from 70° to 180° C. to produce a monomeric peroxide, returning some of said monomeric peroxide and some unreacted allo-ocimene from said second zone to said oxidizing zone, withdrawing crude monomeric peroxide from said second zone and fractionally distilling the same to recover 2,7-peroxy-2,6-dimethyloctadien-3,5.

7. The method defined by claim 6 in which the portion containing some monomeric peroxide and unreacted allo-ocimene is cooled before being returned and said cooled portion along with added allo-ocimene is continuously introduced into said oxidizing zone to render said method continuous.

8. In a method of producing 2,7-peroxy-2,6-dimethyl-octadien-3,5 from allo-ocimene by reaction of said allo-ocimene in liquid phase with molecular oxygen at a temperature of between 5 and 105° C., the improvement which comprises maintaining a neutral to alkaline condition and vigorous agitation of said liquid phase throughout said reaction to produce a polymeric peroxide product.

9. In a process of producing a peroxide compound by introducing allo-ocimene into a liquid phase oxidizing zone with agitation thereof in the presence of molecular oxygen to effect reaction therewith at a temperature of between 5 and 105° C. to produce a crude polymeric peroxide product, subsequently thermally decomposing the crude product in a second zone at a temperature of from 70° to 180° C. to produce a crude monomeric peroxide product, and finally fractionally distilling the crude product to recover a purified monomeric peroxide compound, the improvements which comprise maintaining the liquid phase in said oxidizing zone neutral to alkaline, maintaining a low concentration of said polymeric product in said oxidizing zone by continuously withdrawing said crude polymeric product therefrom, continuously withdrawing the crude monomeric product from said second zone and dividing the same into two portions, continuously returning one said portion to said oxidizing zone, and fractionally distilling the other of said portions to recover 2,7-peroxy-2,6-dimethyloctadien-3,5.

References Cited in the file of this patent

UNITED STATES PATENTS

| | | |
|---|---|---|
| 2,749,368 | Fortuin et al. | June 5, 1956 |
| 2,851,483 | Blumer et al. | Sept. 9, 1958 |
| 2,898,377 | Handy et al. | Aug. 4, 1959 |

OTHER REFERENCES

G. L. Dranishnikov Bull. Acad. Sci. U.S.S.R. Div. Chem. Sci., May–June 1953, pages 421–428. (English.)